S. K. DENNIS.
CLUTCH MECHANISM FOR CORN PLANTERS.
APPLICATION FILED APR. 8, 1911.
1,203,591.
Patented Nov. 7, 1916.
4 SHEETS—SHEET 2.
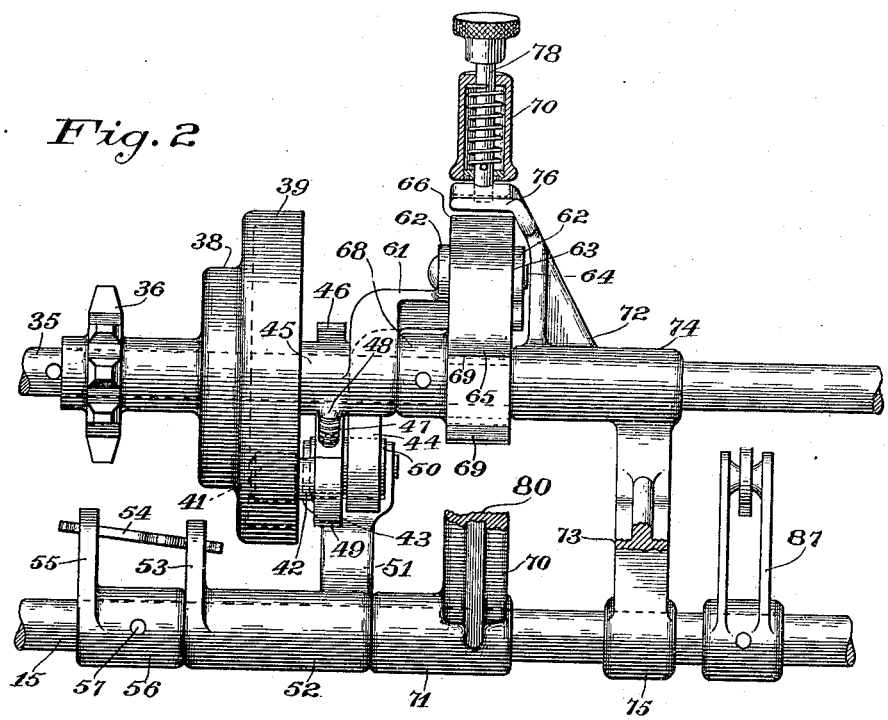
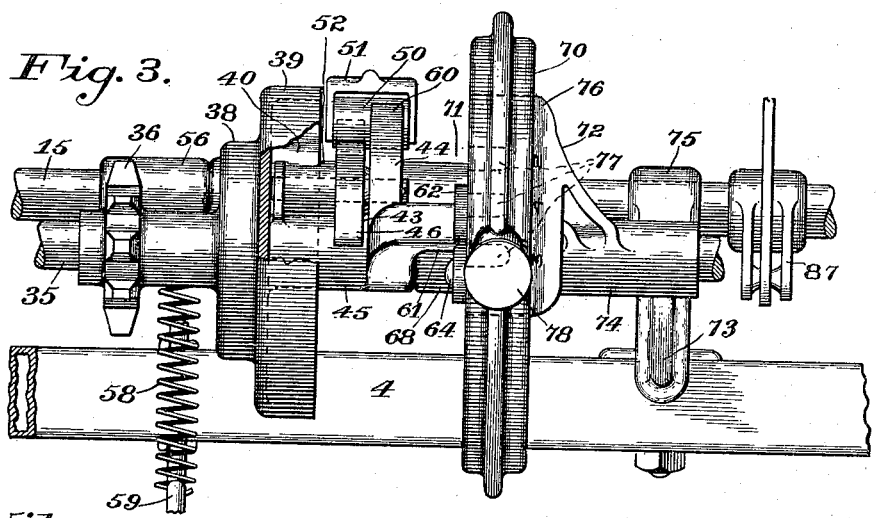
Witnesses:
C. C. Palmer.
F. W. Hoffmeister.
Inventor.
Samuel K. Dennis.
By E. W. Burgess
Attorney.

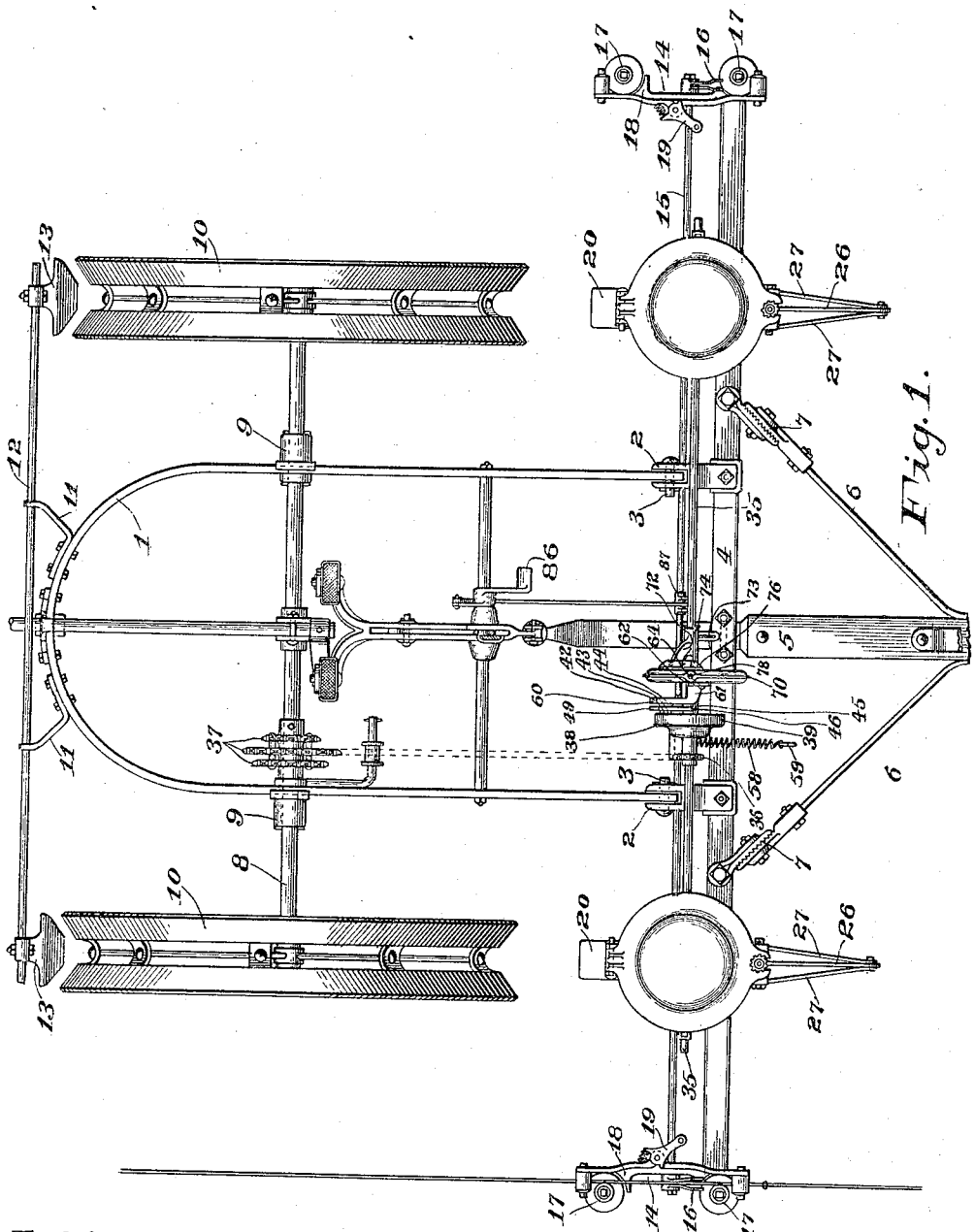

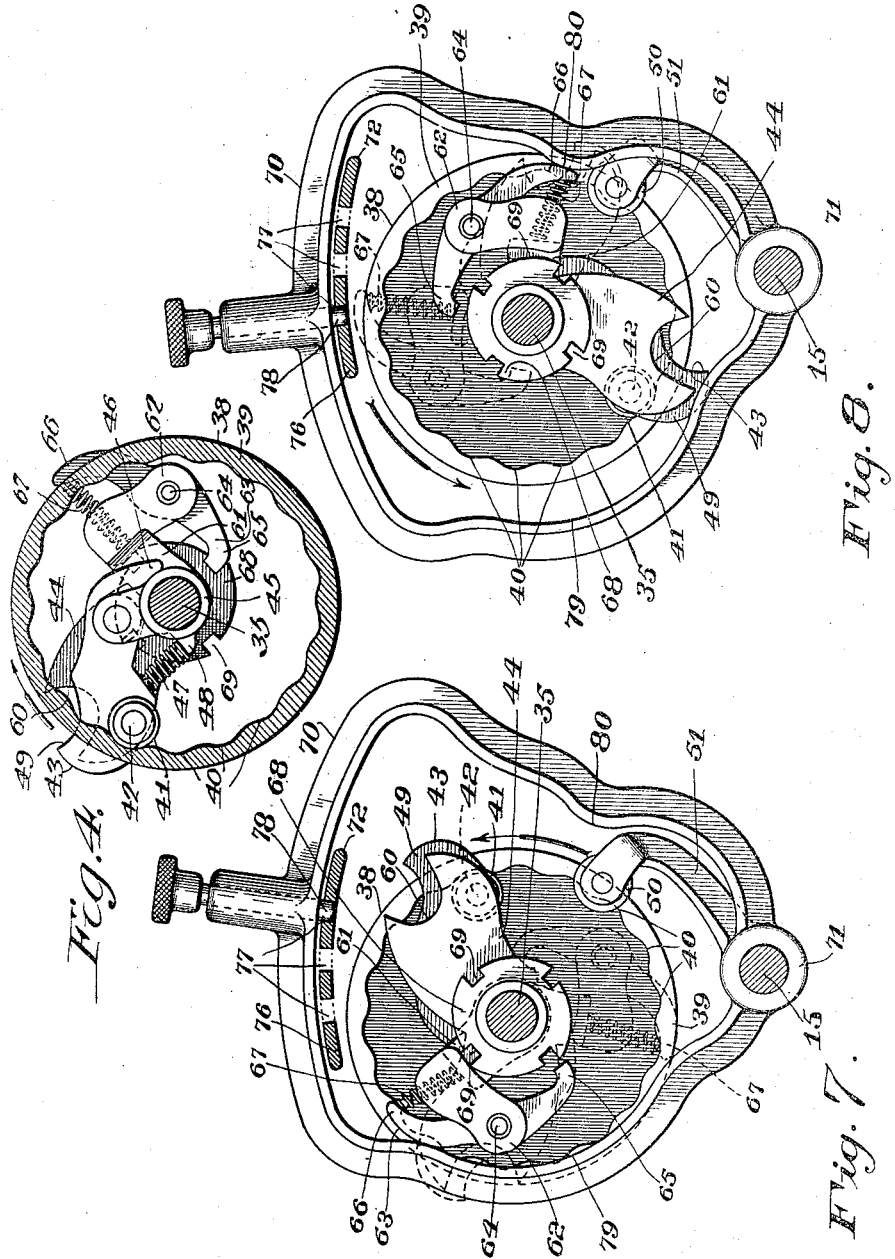

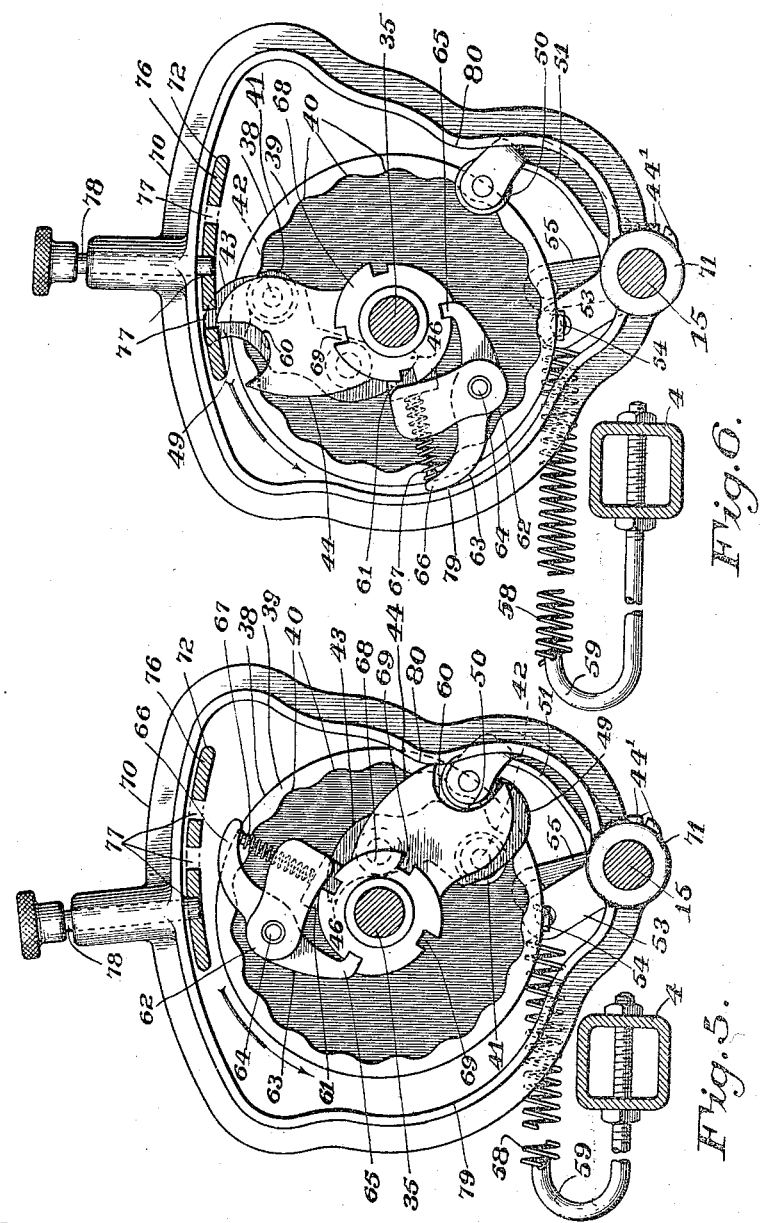

UNITED STATES PATENT OFFICE.

SAMUEL K. DENNIS, OF CHICAGO, ILLINOIS, ASSIGNOR, BY MESNE ASSIGNMENTS, TO INTERNATIONAL HARVESTER CORPORATION, A CORPORATION OF NEW JERSEY.

CLUTCH MECHANISM FOR CORN-PLANTERS.

1,203,591.  Specification of Letters Patent.  Patented Nov. 7, 1916.

Application filed April 8, 1911. Serial No. 619,643.

*To all whom it may concern:*

Be it known that I, SAMUEL K. DENNIS, a citizen of the United States, residing at Chicago, in the county of Cook and State of Illinois, have invented certain new and useful Improvements in Clutch Mechanism for Corn-Planters, of which the following is a specification.

My invention relates to corn planters, and in particular to the mechanism forming part of the associated mechanical elements thereof that is operative to control the seed dropping means, and it consists in an intermittently operating clutch mechanism connected with the feed shaft of a planter in a manner to transmit rotary movement thereto through the traction wheels when tripped into action automatically by means of a check wire operated in a common way or by manually operable means controlled by the operator, and further to means connected with the intermittently operating clutch mechanism and operative to vary the relative angular movement of the feed shaft and the clutch mechanism whereby a variable number of kernels of corn may be dropped by the seed delivering mechanism connected with the feed shaft; the objects of my invention being to provide a clutch mechanism for the purpose indicated that will be positive in its operation, comprising few parts, one that may be readily manipulated, strong and durable in its construction, and not liable to become disarranged and inoperative. I attain these objects by means of mechanism one embodiment of which is illustrated in the accompanying drawings, in which—

Figure 1 represents a top plan view of part of a corn planter having my invention embodied in its structure; Fig. 2 represents a front elevation of part of Fig. 1 on an enlarged scale and designed to illustrate the manner of mounting and the construction of the clutch mechanism; Fig. 3 is a top plan view of Fig. 2; Fig. 4 is a detached detail, partly in section, and designed to illustrate the construction and operation of part of the intermittently operating clutch mechanism connected with the feed shaft; Fig. 5 is a detached detail of part of the clutch cam and its controlling means and designed to show the manner of operating the clutch controlling means whereby a variable number of kernels of corn may be deposited; Fig. 6 is a similar view showing the clutch controlling cam in a different position of adjustment; Fig. 7 is like Fig. 6 excepting the clutch controlling cam has been moved to another position in its adjustment; Fig. 8 represents another position of the clutch controlling cam.

The same reference characters designate the same parts throughout the several views.

1 represents a U-shaped wheel frame having the side members thereof pivotally connected at their front ends to draft brackets 2 by means of pins 3, the brackets being secured to a transversely arranged draft bar 4, to which is secured the rear end of a draft tongue 5, and 6 represents tongue braces upon opposite sides of the tongue, having their front ends secured thereto and their rear ends adjustably connected with the draft bar by means by toothed plate members 7 whereby the front end of the draft tongue may be adjusted to a higher or lower level relative to the draft frame of the machine.

8 represents a driving axle journaled in bearings 9 secured to the side members of the wheel frame, and 10 represents traction and carrying wheels mounted upon opposite ends of said axle.

11 represents rearwardly extending brackets secured to the rear end of the wheel frame, 12 a transverse bar supported by the brackets, and 13 wheel scrapers adjustably mounted upon opposite ends of the bar.

Secured to opposite ends of the draft bar 4 are bracket members 14 having a clutch tripping and a seed valve operating rock shaft 15 journaled therein. The means for rocking said shaft include levers 16, having one end secured to the shaft and the opposite end made fork-shaped in a manner to receive a check wire, the tappets of which operate to swing the lever at stated intervals in a well-known way as the machine is caused to advance, the wire being guided by rollers 17 mounted upon a controlling frame 18 pivotally connected with the bracket in any preferred manner, and 19 represents a common form of spring-pressed latch mechanism that releasably secures the controlling frame in operative position.

Means for rotating the seed shaft include a sprocket wheel 36 loosely journaled upon the shaft and which can be connected by means of a drive chain to either of a series of sprocket wheels 37 having variable diameters and secured to the driving axle in a manner to vary the speed of the shaft relative to that of the axle as desired within the limits of the mechanism.

38 represents a clutch member integral with sprocket wheel 36 and provided with a peripheral rim portion 39 having depressions 40 upon its interior surface that are adapted to receive a roller 41 journaled upon a stud 42 secured to a pawl arm 43 that is pivotally connected with an arm 44 integral with a sleeve 45 loosely journaled upon the seed shaft. The pawl arm is provided with a heel portion 46 upon one side of its pivot that is adapted to contact with the sleeve in a well-known way in a manner to limit a swinging movement of the arm in one direction, and 47 represents a compression spring operative between an ear portion 48 formed upon the sleeve and the opposite side of the pivotal connection of the arm in a manner to yieldingly press said arm in the same direction and to cause said roller to enter the depressions in said clutch member. The roller is normally held out of engagement with the depressions by means of a portion 49 extending beyond the axis of the roller and adapted to contact with a knockout roller 50 that is journaled at the outer end of an outwardly curved arm 51 that is provided with a sleeve portion 52 at its opposite end that loosely receives the clutch tripping shaft 15, and 53 represents a radially projecting arm integral with the sleeve and provided with a transverse opening at its outer end that receives one end of an equalizing bar 54, the opposite end of the bar being received by an opening in a similar arm 55 that is integral with a sleeve 56 that is secured to the clutch tripping shaft by means of a pin 57.

58 represents a tension spring having one end connected with the equalizing bar intermediate the adjacent arms and its opposite end with the hook-shaped end of a rod 59 that has its opposite end adjustably secured to the draft bar 4 in a manner whereby the tension of the spring may be regulated.

The arm 44 is provided at its outer end with a semi-circular notch 60 that is adapted to receive the knockout roller 50 when the clutch parts are in normal position, as illustrated in Fig. 5. 61 represents a supplemental arm integral with the sleeve 45 and extending laterally therefrom in the direction of the axis of the seed shaft and provided with ear portions 62 that project from the arm at right angles with the axis of the shaft and are spaced apart in a manner to receive between them a pawl 63 that rocks about a pin 64 connecting the pawl intermediate its ends with the ear portions. The pawl is provided with a hook-shaped portion 65 at one end thereof and a tail portion 66 at its opposite end, and 67 represents a compression spring operative between the arm and tail of the pawl in a manner to yieldingly rock it in one direction about its pivotal connection with the arm.

68 represents a cylindrical clutch member secured to the seed shaft and provided with a series of grooves 69 upon its periphery, the preferred number being four, that are arranged parallel with the axis of the shaft and adapted to receive the hooked end 65 of pawl 63.

70 represents a swinging cam having a sleeve portion 71 at its lower end that loosely receives the trip shaft, and 72 represents an index bracket having a toe portion 73 at its lower end whereby it is secured to the draft bar 4, and laterally arranged sleeve portions 74 and 75 having openings that loosely receive the seed and clutch tripping shafts, respectively, and 76 represents a laterally extending index plate at the upper end of the bracket that is arranged concentric with the axis of the swinging cam adjacent its inner surface and provided with a series of radially arranged openings 77 that are adapted to receive the inner end of a spring-pressed plunger bolt 78 in a manner to secure the cam in any desired position of adjustment. The swinging cam is provided with two knockout surfaces 79 and 80 at the front and rear sides thereof, respectively, of unequal length, the front one being the longest, said surfaces adapted to contact with the tail portion 66 of the pawl 63 in a manner to rock the pawl about its pivot and disengage the hooked end thereof from the groove 69 in the clutch member 68 with which it may be engaged, and the length of the contact surface with which the pawl engages determines the number of grooves that its hooked end will pass before it is permitted to reëngage with the clutch member. When the swinging cam is thrown forward about its axis and the plunger bolt is in engagement with the index plate, as shown in Figs. 5 and 8, the tail portion of pawl 63 will engage with the short contact surface 80 and disengage the pawl from the groove, and as the tail immediately passes beyond the contact surface the pawl is allowed to move into engagement with the next succeeding groove. When the swinging cam is thrown rearward and the plunger bolt is in engagement with the index plate, as shown in Fig. 7, the tail portion will engage with the long contact surface 79 and hold the pawl inoperative until it passes beyond the end of the surface and is allowed to engage with the next succeeding groove, and when the swinging cam is thrown to a neutral position with the plunger bolt engaging with the index plate, as shown in Fig. 6, the tail portion of the pawl will not contact with either of the knockout surfaces and the pawl will remain engaged with the clutch member continuously.

The clutch mechanism is tripped into action by a rocking movement of the trip shaft in a rearward direction, which causes the knockout roller 50, carried by the curved arm 51, to become disengaged from the pawl arm 43, allowing the latter to rock about its pivot in a manner to cause roller 41 to engage with the depressions in the rim of clutch member 38, and the sleeve 45 is thereby caused to rotate with the clutch member until one complete revolution is made and the arm 43 again contacts with the knockout roller 50, and the clutch members are thereby released from engagement. Arm 44 is first to come in contact with the knockout roller, and as the roller rides over the wall of the semi-circular notch upon the side in the direction of rotation of the arm there is a slight depression of the curved arm carrying the knockout roller, but said depression does not cause the tripping shaft to rock in its bearings for the reason that the arm is loosely mounted upon the shaft and connected with the fixed arm 55 by means of the equalizing bar 54, whereby the arm 53 is permitted to move independent of arm 55 in one direction, but is caused to move therewith in an opposite direction by means of the interlocking ear portions 44¹ upon the adjacent sleeves, the independent movement being for the double purpose of cushioning the shock of contact with the knockout roller and to prevent retrograde rocking of the tripping shaft.

The sleeve 45 carries with it the pawl 63, and the pawl engages with the grooved clutch member 68 in a manner to cause it and the seed shaft to either make a complete or partial revolution, dependent upon the position of adjustment of the swinging cam. With the latter in a neutral position the seed shaft will make a complete revolution. When the cam is adjusted to its forward position the seed shaft will make three-quarters of a revolution, and when the cam is adjusted to its rearward position the seed shaft will make one-half of a revolution. The ratio of the gears connecting the seed shaft with the seed plates is as four to one, and therefore the seed plate will be given one-quarter of a revolution for each complete revolution of the seed shaft; three-sixteenths of a revolution for each three-quarters of a revolution, and one-eighth of a revolution for each one-half revolution thereof. There are sixteen seed cells in the seed plate, equally distributed upon its periphery, and when it is given one-quarter of a revolution there are deposited in the seed conduit four kernels of corn; when given three-sixteenths of a revolution, three kernels, and when given one-eighth of a revolution, two kernels.

The clutch tripping shaft may be either rocked automatically by means of the check wire or manually by means of a foot lever pivotally mounted upon wheel frame of the machine and having a link connection with an arm 87 secured to the clutch tripping shaft.

It will be noted that, when dropping three kernels, through my improved construction of cam member, the pawl which engages the ratchet is disengaged therefrom after three-quarters of a revolution of the seed shaft, a substantial interval being thus provided between the time of disengagement of the pawl and the time of reëngagement of the knockout with the primary clutch mechanism. Obviously, by the improved form of cam shown, a relatively large wearing surface is also provided adapted to give long life to the mechanism, the life of the same also being increased by the fact that a certain cam surface is only used for a certain drop, the elongated or arcuate cam not being used when dropping three kernels and the projection on the opposite side of the cam not being in use when dropping two kernels. It will also be noted that the adjusting mechanism for the cam is within easy reach of the operator and of a compact form readily adapted to shipment without danger of breakage or the necessity of removing parts. The advantages of my improved construction will be apparent to those skilled in the art.

While I have in this application specifically described one embodiment of my invention, it is to be understood that the form shown herein is used for purposes of illustration and that the construction and arrangement of parts may be modified and the invention embodied in other forms without departing from its spirit, it being my intention to include all such constructions within the scope of the appended claims.

What I claim as my invention, and desire to secure by Letters Patent, is:

1. In a planter, a seed shaft, rotary clutch mechanism controlling the movement thereof including a pivoted pawl, and an adjustable swinging cam having a plurality of pawl engaging surfaces thereon independently engageable with said pawl in different positions of said cam.

2. In a planter, a seed shaft, rotary clutch mechanism controlling the connection thereof including a pivoted pawl, a cam pivoted at one side of said shaft having pawl engaging arms extending on opposite sides of said shaft, and means for adjusting said cam about its pivot.

3. In a planter, a seed shaft, rotary clutch mechanism controlling the connection thereof including a pivoted pawl, a cam pivoted at one side of said shaft having pawl engaging arms extending on opposite sides of said shaft, and means carried by one of said pawl engaging arms above said shaft for adjusting said cam about its pivot.

4. In a planter, a seed shaft, rotary clutch mechanism controlling the connection thereof including a pivoted pawl, a cam pivoted at one side of said shaft having pawl engaging arms extending on opposite sides of said shaft, and cam adjusting means supported by said cam in the interval between its arms and engageable with said frame.

5. In a planter, a seed shaft, rotary clutch mechanism controlling the connection thereof including a pivoted pawl, a cam pivoted at one side of said shaft having pawl engaging arms protruding therefrom on opposite sides of said shaft, one of said arms having an arcuate cam surface and the other having a projection thereon, and means for adjusting said cam whereby said pawl may engage either said cam surface or said projection.

6. In a planter, a seed shaft, rotary clutch mechanism controlling the connection thereof including a pivoted pawl, a cam pivoted at one side of said shaft having pawl engaging arms protruding therefrom on opposite sides of said shaft, one of said arms having an arcuate pawl engaging surface and the other having a projection thereon, and means for adjusting said cam whereby said pawl may engage either said pawl engaging surface or said projection or rotate freely without engaging either of the same.

7. In a planter, a frame, a seed shaft journaled thereon, variable clutch mechanism operatively connected to said shaft including a pawl, a swinging cam pivoted at one side of said shaft and having pawl engaging arms extending on opposite sides thereof engageable with said pawl in different positions of said cam, a member bridging the space between said arms on the opposite side of said shaft from said cam pivot, and means including an adjustable member carried on said last mentioned member engageable with said frame in a plurality of positions of said cam.

8. In a planter, a frame, a seed shaft journaled thereon, variable clutch mechanism operatively connected to said shaft including a pawl, a swinging cam pivoted at one side of said shaft and having pawl engaging arms extending on opposite sides thereof engageable with said pawl in different positions of said cam, a member bridging the space between said arms on the opposite side of said shaft from said cam pivot, and means including a resiliently connected member carried on said last mentioned member and engageable with said frame in a plurality of positions of said cam.

9. In a planter, the combination with a seed dropping plate of a feed shaft, continuously operating mechanism including a ratchet wheel journaled upon said shaft, a clutch comprising a body secured to said shaft and carrying two pawls, one of said pawls adapted to be thrown into engagement with said ratchet and moved a certain predetermined distance, a second ratchet wheel secured to said shaft, the second pawl adapted to be thrown into engagement with said second ratchet wheel during a whole or a part of the predetermined movement of said first pawl, and an adjustable member having cam surfaces disposed on opposite sides of said second ratchet engageable with said second pawl.

10. In a planter, the combination with a seed dropping plate of a feed shaft, continuously operating mechanism including a ratchet wheel journaled upon said shaft, a clutch comprising a body secured to said shaft and carrying two pawls, one of said pawls adapted to be thrown into engagement with said ratchet and moved a certain predetermined distance, a second ratchet wheel secured to said shaft, the second pawl adapted to be thrown into engagement with said second ratchet wheel during a whole or a part of the predetermined movement of said first pawl, a pivoted cam member having pawl engaging members projecting on opposite sides of said second ratchet wheel and engageable with the pawl engageable therewith, and means for adjusting said cam member about its pivot.

11. A clutch mechanism including, in combination, a rotatable shaft, a constantly rotatable clutch member journaled upon said shaft and having a rim portion provided with internal depressions therein, a sleeve journaled upon said shaft adjacent said clutch member and provided with a pawl carrying arm having a semi-circular notch at its outer end, a rocking clutch tripping arm having a roller journaled thereon and adapted to engage with said notch, a spring-pressed pawl pivotally mounted upon said pawl carrying arm and adapted to engage with said internal depressions and with the roller upon said clutch tripping arm, a second clutch member secured to said shaft at the opposite end of said sleeve and provided with pawl engaging grooves upon its periphery, a second spring-pressed pawl carried by said sleeve and adapted to engage with said grooves, an adjustable cam pivoted beneath said shaft and engageable with said second pawl having a portion disposed transversely of said shaft, and controlling means connected to said transverse portion of said cam above the pivot thereof controlling the adjustment thereof.

12. A clutch mechanism including, in combination, a rotatable shaft, a constantly rotatable clutch member journaled upon said shaft and having a rim portion provided with internal depressions therein, a sleeve journaled upon said shaft adjacent said clutch member and provided with a pawl carrying arm having a semi-circular notch at its outer end, a rocking clutch tripping arm having a roller journaled thereon and adapted to engage with said notch, a spring-pressed pawl pivotally mounted upon said pawl carrying arm and adapted to engage with said depressions and with the roller upon said clutch tripping arm, a second clutch member secured to said shaft at the opposite end of said sleeve and provided with pawl engaging grooves upon its periphery, a second spring-pressed pawl pivotally mounted upon said sleeve and having one end adapted to engage with said grooves, a swinging cam surrounding said second clutch member and adapted to contact with the opposite end of said second pawl in a manner to disengage said pawl from said grooves at varying degrees of the angular movement of said second clutch member.

13. A clutch mechanism including in combination, a rotatable shaft, a constantly rotatable clutch member journaled upon said shaft and provided with a rim portion having internal depressions therein, a sleeve journaled upon said shaft adjacent said clutch member and provided with a pawl-carrying arm having a semi-circular notch at its outer end, a rock shaft journaled adjacent said rotatable shaft and means for rocking said shaft, a clutch tripping arm secured to said shaft in a manner to rock therewith in one direction and having a roller journaled thereon and adapted to engage with said notch, a spring-pressed pawl pivotally mounted upon said pawl carrying arm and adapted to engage with said internal depressions and with the roller upon said clutch tripping arm, a second clutch member secured to said rotatable shaft at the opposite end of said sleeve and provided with pawl engaging grooves upon its periphery, a second spring-pressed pawl pivotally mounted upon said sleeve and having one end adapted to engage with said grooves, a swinging cam surrounding said second clutch member and pivotally mounted upon said rock shaft, said cam adapted to contact with the opposite end of said second pawl in a manner to disengage said pawl from said grooves at varying degrees of the angular movement of said second clutch member, and means for retaining said cam in various positions of its adjustment.

SAMUEL K. DENNIS.

Witnesses:
JAMES A. MOXEY,
EVAN EVANS.

Copies of this patent may be obtained for five cents each, by addressing the "Commissioner of Patents, Washington, D. C."